United States Patent
Chao et al.

(10) Patent No.: US 8,956,910 B2
(45) Date of Patent: Feb. 17, 2015

(54) METHOD FOR FABRICATING PHOTOANODE FOR DYE-SENSITIZED SOLAR CELL

(75) Inventors: Yu-Chou Chao, Taipei (TW); Yun-Yun Chu, Taoyuan County (TW)

(73) Assignee: Taiwan Textile Research Institute, New Taipei (TW)

( * ) Notice: Subject to any disclaimer, the term of this patent is extended or adjusted under 35 U.S.C. 154(b) by 379 days.

(21) Appl. No.: 13/484,288

(22) Filed: May 31, 2012

(65) Prior Publication Data

US 2012/0305068 A1 Dec. 6, 2012

(30) Foreign Application Priority Data

Jun. 1, 2011 (TW) .............................. 100119269 A
May 15, 2012 (TW) .............................. 101117251 A

(51) Int. Cl.
*H01L 51/48* (2006.01)
*H01G 9/20* (2006.01)

(52) U.S. Cl.
CPC ............ *H01G 9/2031* (2013.01); *Y02E 10/542* (2013.01)
USPC .......................................... 438/82; 136/263

(58) Field of Classification Search
USPC .......................................................... 438/82
See application file for complete search history.

(56) References Cited

U.S. PATENT DOCUMENTS

| | | | | |
|---|---|---|---|---|
| 8,066,932 | B2* | 11/2011 | Xu ................................ | 264/444 |
| 2007/0113358 | A1* | 5/2007 | Rabolt et al. ...................... | 8/500 |
| 2010/0006150 | A1* | 1/2010 | Nishio et al. ................... | 136/258 |
| 2010/0221863 | A1* | 9/2010 | Kim et al. ......................... | 438/69 |
| 2010/0330419 | A1* | 12/2010 | Cui et al. ....................... | 429/209 |
| 2011/0079275 | A1* | 4/2011 | Qiao et al. ..................... | 136/252 |

FOREIGN PATENT DOCUMENTS

| | | |
|---|---|---|
| EP | 1801909 A1 | 6/2007 |
| EP | 2031613 A2 | 3/2009 |
| TW | 201016909 A | 5/2010 |

OTHER PUBLICATIONS

Choi et al., Photocatalytic Comparison of TiO2 Nanoparticles and Electrospun TiO2 Nanofibers: Effects of Mesoporaoisty and Interparticle Charge Transfer, Journal of Physical Chemistry, vol./Issue 114, pp. 16475-16480 (2010).*
Li et al., Fabrication of Titania Nanofibers by Electrospinning, Nano Letters, vol. 3, No. 4, pp. 555-560 (2003).*

* cited by examiner

*Primary Examiner* — Jayne Mershon
(74) *Attorney, Agent, or Firm* — CKC & Partners Co., Ltd.

(57) ABSTRACT

A method for fabricating a photoanode for a dye-sensitized solar cell (DSSC) is provided. The method includes the following steps. A particle colloid is electrospun to form a first electrospun thin film layer on a substrate. The particle colloid includes titanium dioxide nanopartictes, a polymer material, a dispersing agent and a solvent. The first electrospun thin film layer is then sintered to form a main titanium dioxide layer. A photoanode manufactured by the method mentioned above is also provided.

19 Claims, 2 Drawing Sheets

METHOD FOR FABRICATING PHOTOANODE FOR DYE-SENSITIZED SOLAR CELL

RELATED APPLICATIONS

This application claims priority to Taiwan Application Serial Numbers 100119269, filed Jun. 1, 2011, and 101117251, filed May 15, 2012, which are herein incorporated by reference.

BACKGROUND

1. Technical Field

The present disclosure relates to a method for fabricating a photoanode for a dye-sensitized solar cell.

2. Description of Related Art

A dye-sensitized solar cell (DSSC) is recognized as one of the new generation solar cells in that the DSSC exhibits advantages like a simple process, easy mass production and a low cost. A photoanode used in the DSSC includes a titanium dioxide layer and dye absorbing therein. The titanium dioxide layer absorbs ultraviolet light, but not visible light, to convert to electricity. Therefore, there is a need for the dye to absorb visible light to improve electricity output.

Further, to ensure performances of the DSSC, the titanium dioxide layer of the photoanode should meet certain essential requirements, for instance, good thickness uniformity, excellent film-forming property and strong adhesion to a substrate. In the prior art, the titanium dioxide layer is typically formed by a micron wet-coating method, an electrophoretic method, a screen-printing method or a scraper method, and then sintering. However, it is difficult for the foregoing manufacturing methods to meet all the essential requirements. For example, the titanium dioxide layer made by screen-printing method exhibits good film-forming property but poor adhesion to the substrate, such that the titanium dioxide layer is easy to fall apart.

Furthermore, recently, the method for absorbing the dye into the titanium dioxide layer is to soak that layer in a dye solution. Nevertheless, it takes quite a long time, usually at least 8 hrs, for the soaking process.

Accordingly, in the technical field of the dye-sensitized solar cells, there is also a need for a low cost method for preparing a photoanode exhibiting good performance to enhance competitiveness of the DSSC in the market.

SUMMARY

The following presents a summary of the disclosure in order to provide a basic understanding. The summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

An embodiment of the present disclosure is to provide a method for fabricating a photoanode of a dye-sensitized solar cell, which includes steps described below. A particle colloid is electrospun to form a first electrospun thin film layer on a substrate. The particle colloid includes titanium dioxide nanoparticles, a polymer in aid of film formation, a dispersing agent and a solvent. The first electrospun thin film layer is then sintered to form a main titanium dioxide layer.

Another embodiment of the present disclosure is to provide a photoanode of a dye-sensitized solar cell, which is fabricated according to any method mentioned above.

BRIEF DESCRIPTION OF THE DRAWINGS

The disclosure may be more fully understood by reading the following detailed description of the embodiments, with reference made to the accompanying drawings as follows.

DETAILED DESCRIPTION

Figure 1:
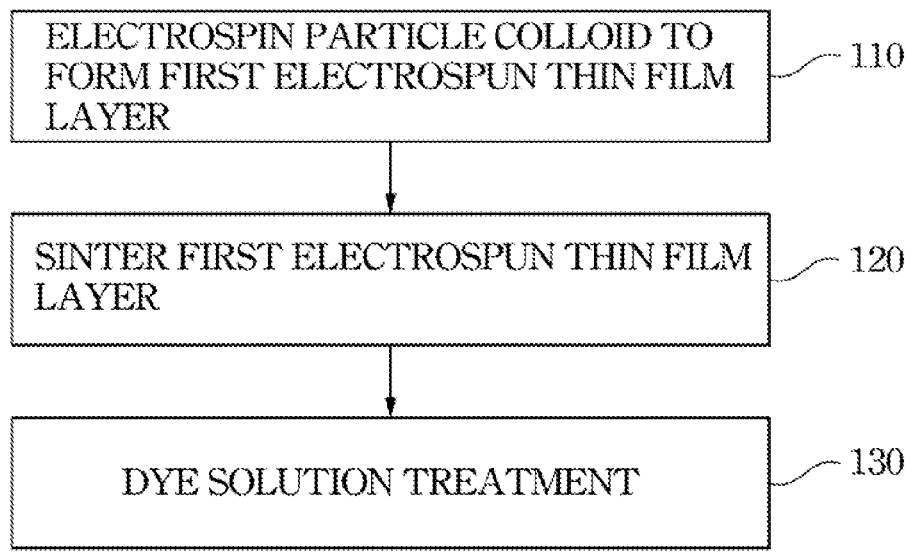
FIG. 1 is a flow chart of a method for fabricating a photoanode of a dye-sensitized solar cell according to one embodiment of the present disclosure.

The present disclosure is described by the following specific embodiments. Those with ordinary skill in the arts can readily understand the other advantages and functions of the present disclosure after reading the disclosure of this specification. The present disclosure can also be implemented with different embodiments. Various details described in this specification can be modified based on different viewpoints and applications without departing from the scope of the present disclosure.

Reference will now be made in detail to the embodiments of the present disclosure, examples of which are illustrated in the accompanying drawings. Wherever possible, the same reference numbers are used in the drawings and the description to refer to the same or like parts.

Figure 2:
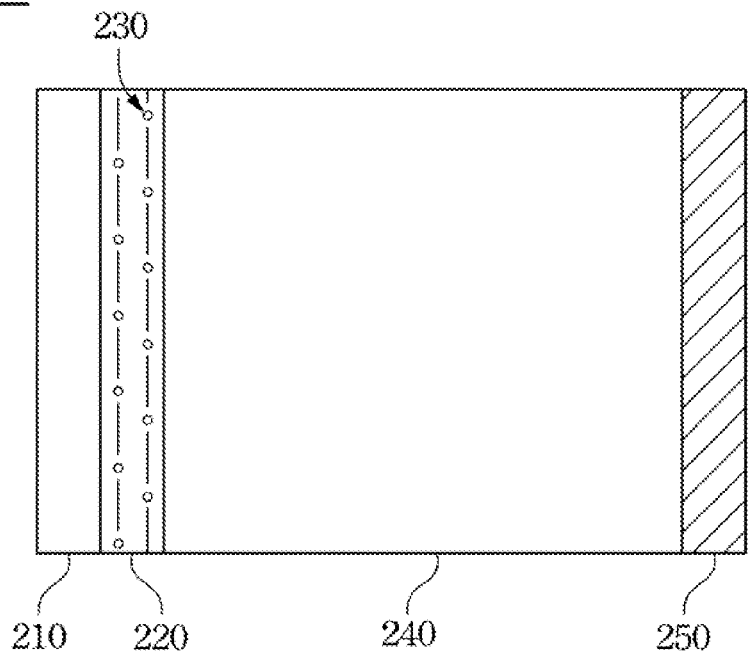
FIG. 2 is a schematic diagram of a dye-sensitized solar cell according to one embodiment of the present disclosure.

FIG. 1 is a flow chart of a method 100 for fabricating a photoanode of a dye-sensitized solar cell according to one embodiment of the present disclosure. The method 100 includes electrospinning a particle colloid to form a first electrospun thin film layer (step 110), sintering the first electrospun thin film layer (step 120), and performing a dye solution treatment (step 130). FIG. 2 is a schematic diagram of a dye-sensitized solar cell according to one embodiment of the present disclosure.

In step 110, the titanium dioxide particle colloid is electrospun to form the first electrospun thin film layer on a substrate 210. The substrate 210 may be a plate having a conductive layer, such as indium tin oxide (ITO) or fluorine-doped tin oxide (FTO). The plate may be made of a metal sheet, a glass plate or a plastic plate.

The principle of the electrospinning process would be briefly described below. First, the emission electrode applies a high voltage to the particle colloid to be charged. The charged particle colloid is sprayed through a nozzle, and dispersed into fibers are then formed due to having the same electricity therethrough. Sequentially, the fibers are towed to the collector by the attraction of electricity. Finally, nanoscale electrospun fibers are formed after volatilizing solvent therein. In a macro view, the interwoven electrospun fiber may be acted as an electrospun thin film layer. The voltage, a flow rate of colloid, and a volatilization rate of the solvent would affect the characteristics of the electrospun thin film layer. In addition, the electrospun thin film layer fabricated by the electrospinning process exhibits better thickness uniformity compared to the layers prepared by a general scraper method or an electrophoretic method. In one embodiment, the process voltage of the step of electrospinning the particle colloid is in a range of 12 to 18 kV, and better in a range of 13 to 15 kV. The flow rate is in a range of 0.5 to 1 ml/hr.

The particle colloid includes nanoscale titanium dioxide particles, a polymer material, a dispersing agent and a solvent. For instance, the four materials are mixed in a certain ratio and grinded to form the particle colloid.

The particle size of the titanium dioxide nanoparticles may be ranging from 10 to 100 nm, such as P25 (Degussa Corporation) titanium dioxide particles.

The polymer material is used to increase a film-forming property of the first electrospun thin film layer and adhesion to the substrate. The polymer material may be polyethylene glycol (PEG), polyethylene oxide (PEO), polyvinylpyrrolidone (PVP) or combinations thereof.

The dispersing agent is employed to prevent the titanium dioxide nanoparticles from aggregation. The dispersing agent may be acetylacetonate (ACAC) or polyoxyethylene octyl phenyl ether (Triton X-100).

The solvent may be water, ethanol or combinations thereof. After forming the electrospun fibers, ethanol can be rapidly removed due to excellent volatility thereof.

The composition of the particle colloid is exemplified below. The titanium dioxide nanoparticles are present in an amount ranging from 15 wt % to 30 wt % by weight relative to total weight. The dispersing agent is present in an amount ranging from 5 wt % to 10 wt % by weight relative to total weight. The polymer material is present in an amount ranging from 3 wt % to 10 wt % by weight relative to total weight. The remaining weight percentage of the particle colloid is the solvent.

In one embodiment, the solvent of the particle colloid is a mixture including water and ethanol, and the volume ratio (V1/V2) of the water (V1) to the ethanol (V2) is in a range of 0.5 to 2.

In step 120, the first electrospun thin film layer is sintered to form a main titanium dioxide layer 220. The organic compounds in the first electrospun thin film layer are degraded to retain the porous main titanium dioxide layer 220 by a high temperature process. The sintering process has a maximum temperature ranging from about 400° C. to about 500° C.

In step 130, the dye solution treatment is performed on the main titanium dioxide layer 220 to absorb the dye 230. For instance, the main titanium dioxide layer 220 may be soaked in the dye solution or the dye solution may be electrospun on the main titanium dioxide 220.

In one embodiment, the main titanium dioxide layer 220 is soaked in the dye solution for a period of time ranging from 8 hr to 24 hr.

In another embodiment, the dye solution is electrospun on the main titanium dioxide 220. Specifically, the main titanium dioxide 220 is disposed on the collector; the dye solution is then electrospun on the main titanium dioxide 220 by using an electrospinning device. The dye 230 would be retained in pores of the main titanium dioxide 220 or on the surface thereof due to gradually volatilizing the solvent in the electrospinning process. In one embodiment, the process voltage of the step of electrospinning the dye solution is in a range of 2 to 6 kV. The flow rate is in a range of 0.1 to 0.5 ml/hr.

The dye solution contains the dye 230 and a solvent. The dye 230 may to be di-tetrabutylammonium cis-bis(isothiocyanato) bis(2,2'-bipyridyl-4,4'-dicarboxylato)ruthenium(II) (N719) or cis-bis(isothiocyanato)bis(2,2-bipyridyl-4,4-dicarboxylato)-ruthenium(II) (N3). The solvent may be anhydrous ethanol.

Finally, the photoanode, manufactured by the method mentioned above, and a counter electrode 250 are assembled, and an electrolyte 240 is then injected between those electrodes to form a dye-sensitized solar cell 200. The counter electrode 250 may be an electrode including a platinum layer. The electrolyte 240 may be composed of 0.05 M iodine solution, a 0.5 M lithium iodide solution and 0.5 M 4-tert-Butylpyridine (TBP) solution. The solvent of the electrolyte 240 may be acetonitrile. The materials of the counter electrode 250 and the electrolyte 240 have been disclosed by the prior art, and thus there is only a brief example provided herein to understand.

Figure 3:
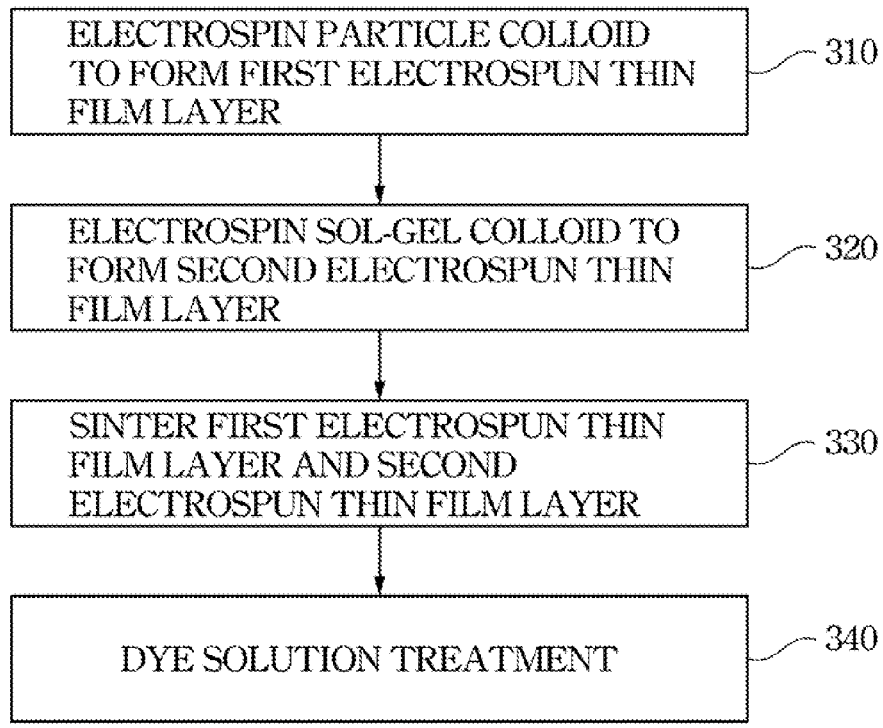
FIG. 3 is a flow chart of a method for fabricating a photoanode of a dye-sensitized solar cell according to another embodiment of the present disclosure.
Figure 4:
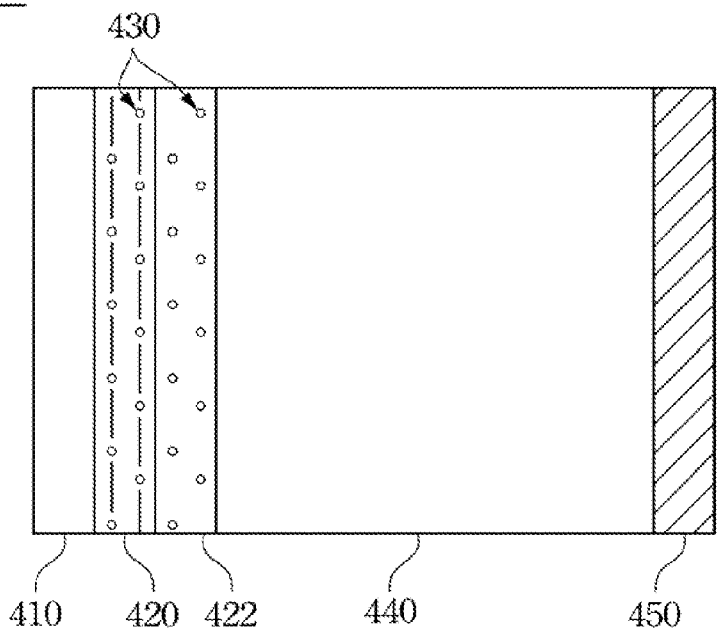
FIG. 4 is a schematic diagram of a dye-sensitized solar cell according to another embodiment of the present disclosure.

FIG. 3 is a flow chart of a method 300 for fabricating a photoanode of a dye-sensitized solar cell according to another embodiment of the present disclosure. The method 300 includes electrospinning a particle colloid to form a first electrospun thin film layer (step 310), electrospinning a sol-gel colloid to form a second electrospun thin film layer (step 320), sintering the first electrospun thin film layer and the second electrospun thin film layer (step 330), and performing a dye solution treatment (step 340). The specific embodiments of step 310 may be the same as those described above in connection with step 110. FIG. 4 is a schematic diagram of a dye-sensitized solar cell according to another embodiment of the present disclosure.

In step 320, a sol-gel colloid is electrospun on the first electrospun thin film layer to form a second electrospun thin film layer. The sol-gel colloid includes a titanium alkoxide, a dispersing agent and a solvent. For example, the titanium alkoxide, the dispersing agent and the solvent are mixed and then stirred to form the sol-gel colloid.

The titanium alkoxide may include one or more species of titanium alkoxides, in which each of the titanium alkoxides may include one to four alkoxide groups. The titanium alkoxide may be titanium (IV) isopropoxide. Both the dispersing agent and the solvent of the sol-gel colloid may be the same as or different from those of the particle colloid. For instance, polyoxyethylene octyl phenyl ether is used as the dispersing agent, and ethanol is employed as the solvent.

When the titanium alkoxide is contacted with moisture, hydrolysis-condensation reaction of the titanium alkoxide would occur and then form nanoscale titanium dioxide particles. Comparing to the particle colloid, the particle-size distribution of the titanium dioxide particles formed by the hydrolysis-condensation reaction is broader. Sintered titanium dioxide particles exhibit excellent light scattering effect because of different sizes of those particles.

The composition of the sol-gel colloid is exemplified below. The titanium alkoxide is present in an amount ranging from 0.3 wt % to 0.9 wt % by weight relative to total weight. The dispersing agent is present in an amount lower than 0.001 wt % by weight relative to total weight. The remaining weight percentage of the sol-gel colloid is the solvent.

In one embodiment, after step 320, the porous second electrospun thin film layer is soaked in the sol-gel colloid, such that pores thereof are filled with the sol-gel colloid.

In step 330, the first electrospun thin film layer and the second electrospun thin film layer are sintered to respectively form the main titanium dioxide layer 420 and a scattering titanium dioxide layer 422. The maximum temperature of the sintering step is ranging from about 400° C. to about 500° C. The scattering titanium dioxide layer 422 is employed to lengthen light paths, and thus to further increase light utilization efficiency of the dye-sensitized solar cell.

In step 340, the dye solution treatment is performed on the scattering titanium dioxide layer 422 to absorb the dye 430. For instance, the main titanium dioxide layer 420 and the scattering titanium dioxide layer 422 may be soaked in the dye solution or the dye solution may be electrospun on the scattering titanium dioxide layer 422.

In one embodiment, both the main titanium dioxide layer 420 and the scattering titanium dioxide layer 422 are soaked in the dye solution for a period of time ranging from 8 hr to 24 hr.

In another embodiment, the dye solution is electrospun on the scattering titanium dioxide layer 422. Specifically, the scattering titanium dioxide layer 422 is disposed on the collector; the dye solution is then electrospun on the scattering titanium dioxide layer 422 by using an electrospinning device. The dye 430 would be remained in pores of the scattering titanium dioxide layer 422 or on the surface thereof due to gradually volatilizing the solvent during the electrospinning process. In addition, the dye solution may penetrate into the porous main titanium dioxide layer 420, such that the dye 430 may be located in the pores or on the surface thereof. In another embodiment, the process voltage of the step of electrospinning the dye solution is in a range of 2 to 6 kV. The flow rate is in a range of 0.1 to 0.5 ml/hr.

Similarly, the photoanode, manufactured by the method mentioned above, and a counter electrode 450 are assembled, and an electrolyte 440 is then injected between those electrodes to form a dye-sensitized solar cell 400.

As mentioned above, the main titanium dioxide layer, manufactured by performing electrospinning and sintering processes of those embodiments of the present disclosure, exhibits high thickness uniformity, a favorable film-forming property and good adhesion with low manufacturing cost. Furthermore, the scattering titanium dioxide layer, fabricated by performing electrospinning and sintering processes, may be formed on the main titanium dioxide layer to further increase light utilization efficiency of the dye-sensitized solar cell.

Comparing to the soaking process with the dye solution, the electrospinning process can be employed to greatly reduce processing time and usage amount of the dye. Moreover, the soaking process is a batch process in general; however, the electrospinning process may be applied in a continuous roll-to-roll process, and thus has a great advantage in processing speed.

As mentioned above, the photoanodes, prepared by those embodiments of the present disclosure, exhibit good thickness uniformity, a favorable film-forming property and strong adhesion, and can be applied to decrease usage amount of the dye, processing time and manufacturing cost. Therefore, those embodiments of the present disclosure have extremely high commercial value, and are beneficial to apply in the manufacturing process of the dye-sensitized solar cell.

EXAMPLES

The following Examples are provided to illustrate certain aspects of the present disclosure and to aid those of skill in the art in practicing this disclosure. These Examples are in no way to be considered to limit the scope of the disclosure in any manner.

Examples 1-2

Photoanode Prepared by Different Processes for Absorbing Dye

The process flow of EXAMPLE 1 (abbreviated as 1p2d) is electrospinning a particle colloid and then soaking a dye solution. The process flow of EXAMPLE 2 (abbreviated as 1p1d) is electrospinning a particle colloid and then electrospinning a dye solution. The abbreviations "1" and "2" respectively refer to the electrospinning process and the soaking process. The abbreviations "p" and "d" respectively refer to the particle colloid and the dye. The processing steps would be described in more detail below.

Firstly, the particle colloid is prepared. 1.5 g of the nanoscale titanium dioxide powder (P25), 0.4 g of polyethylene glycol, 0.05 ml of Triton X-100, ethanol and water are mixed and grinded to form the particle colloid.

Sequentially, the particle colloid is electrospun on the substrate having a transparent conductive layer, and a sintering process is then performed to form a main titanium dioxide layer. Specifically, a glass plate having a transparent conductive thin film is disposed on the collector of an electrospinning device, and the particle colloid is then electrospun on that film. The process voltage is set to 15 kV, and the flow rate is set to 0.75 ml/hr. After forming a first electrospun thin film layer with a certain thickness, the sintering process is performed. The temperature profile of the sintering process is described below: heating from ambient temperature to 150° C. for 20 min, holding at 150° C. for 1 hr, heating from 150° C. to 250° C. for 20 min, holding at 250° C. for 1 hr, heating from 250° C. to 350° C. for 20 min, holding at 350° C. for 1 hr, heating from 350° C. to 450° C. for 20 min, and holding at 450° C. for 1 hr. Thus, the polymer material and the dispersing agent are degraded and then removed to retain the main titanium dioxide layer.

The main titanium dioxide layer did not break in a naked-eye inspection of appearance; also, there is no falling powder when tapping the glass plate. Therefore, the main titanium dioxide layer exhibits a favorable film-forming property and good adhesion to the transparent conductive thin film.

Afterwards, the main titanium dioxide layer is soaked in the dye solution for 24 hr to absorb the dye therein. The dye is di-tetrabutylammonium cis-bis(isothiocyanato) bis(2,2'-bipyridyl-4,4'-dicarboxylato)ruthenium(II) (N719), and the solvent is anhydrous ethanol. The concentration of the dye solution is $2 \times 10^{-4}$ M.

Finally, the photoanode, manufactured by the process mentioned above, and a counter electrode (i.e. cathode) is assembled, and an electrolyte is then injected between those electrodes to form a dye-sensitized solar cell. The counter electrode is an electrode having a platinum layer. The electrolyte is injected to the space between the photoanode and the counter electrode. The electrolyte is composed of 0.05 M iodine solution, a 0.5 M lithium iodide solution and 0.5 M 4-tert-Butylpyridine (TBP) solution. The solvent of the electrolyte is acetonitrile.

The method for fabricating the main titanium dioxide layer of EXAMPLE 2 is the same as the method mentioned above of EXAMPLE 1. The difference between EXAMPLES 1 and 2 lies in the process for absorbing the dye. Electrospinning the dye solution on the main titanium dioxide layer is carried out in EXAMPLE 2. The electrospinning process voltage is set to 2-6 kV, and the flow rate is set to 0.1 ml/hr. The dye solution of EXAMPLE 2 is identical as that of EXAMPLE 1.

The dye-sensitized solar cells are tested for power conversion efficiency (η) listed in Table 1.

TABLE 1

|  |  |  |  | EXAMPLE 1 1p2d | EXAMPLE 2 1p1d |
|---|---|---|---|---|---|
| particle colloid | nanoscale titanium dioxide powder | g |  | 1.5 |  |
|  | dispersing agent | ACAC | ml | 0.5 |  |
|  |  | Triton X-100 | ml | 0.05 |  |
|  | polymer material | PEG | g | 0.4 |  |
|  | solvent | water | ml | 2 |  |
|  |  | ethanol | ml | 2 |  |

TABLE 1-continued

|  |  |  |  | EXAMPLE 1 1p2d | EXAMPLE 2 1p1d |
|---|---|---|---|---|---|
| dye solution | process |  |  | soaking | electrospinning |
|  | dye | N719 | g |  | 0.01 |
|  | solvent | 100% ethanol | ml |  | 50 |
| characteristic of DSSC |  | η | % | 4.1 | 2.8 |

In Table 1, both the two dye-sensitized solar cells exhibit a certain level of the power conversion efficiency, and thus the result proves that such processes for preparing the photoanodes by using such particle colloid are feasible.

Examples 3-11

Photoanode Prepared by Using Different Polymer Materials

The process flows of EXAMPLES 3 to 11 are the same as EXAMPLE 1. In EXAMPLES 3 to 8 and EXAMPLES 9 to 11, polyethylene oxide (PEO) and polyvinylpyrrolidone (PVP) are respectively used as the polymer materials. The dye-sensitized solar cells are tested for short circuit current density (Jsc), open circuit voltage (Voc), fill factor (FF), and power conversion efficiency (η) which are listed in Table 2.

TABLE 2

|  |  | characteristics of DSSC | | | |
|---|---|---|---|---|---|
|  | molecular weight | weight (g) | Jsc (mA/cm$^2$) | Voc (V) | FF (%) | η (%) |
| PEO | | | | | | |
| EXAMPLE 3 | 900k | 0.45 | 8.62 | 0.65 | 0.56 | 3.15 |
| EXAMPLE 4 |  | 0.30 | 8.14 | 0.68 | 0.55 | 3.03 |
| EXAMPLE 5 |  | 0.15 | 3.41 | 0.70 | 0.63 | 1.50 |
| EXAMPLE 6 | 400k | 0.45 | 8.95 | 0.69 | 0.55 | 3.38 |
| EXAMPLE 7 |  | 0.30 | 8.49 | 0.67 | 0.56 | 3.20 |
| EXAMPLE 8 |  | 0.15 | 5.53 | 0.74 | 0.61 | 2.48 |
| PVP | | | | | | |
| EXAMPLE 9 | 20k | 0.45 | 7.32 | 0.72 | 0.65 | 3.41 |
| EXAMPLE 10 |  | 0.30 | 3.25 | 0.68 | 0.69 | 1.52 |
| EXAMPLE 11 |  | 0.15 | 2.43 | 0.66 | 0.61 | 0.97 |

In Table 2, both polyethylene oxide (PEO) and polyvinylpyrrolidone (PVP) also can be used in the particle colloid. While all using 0.15 g of the polymer materials in EXAMPLES 5, 8 and 11, the power conversion efficiency of the dye-sensitized solar cells by using polyethylene oxide is better than that by using polyvinylpyrrolidone. In addition, the power conversion efficiency of EXAMPLES 3 to 11 is ranging from 0.97% to 3.41%.

Examples 12-20

Photoanode Prepared by Using Different Polymer Materials

The process flows of EXAMPLES 12 to 20 are the same as EXAMPLE 2. In EXAMPLES 12 to 17 and EXAMPLES 18 to 20, polyethylene oxide (PEO) and polyvinylpyrrolidone (PVP) are respectively used as the polymer materials. The dye-sensitized solar cells are tested for short circuit current density (Jsc), open circuit voltage (Voc), fill factor (FF), and power conversion efficiency (η) which are listed in Table 3.

TABLE 3

|  |  | characteristics of DSSC | | | |
|---|---|---|---|---|---|
|  | molecular weight | weight (g) | Jsc (mA/cm$^2$) | Voc (V) | FF (%) | η (%) |
| PEO | | | | | | |
| EXAMPLE 12 | 900k | 0.45 | 6.27 | 0.71 | 0.54 | 2.39 |
| EXAMPLE 13 |  | 0.30 | 6.74 | 0.61 | 0.56 | 2.28 |
| EXAMPLE 14 |  | 0.15 | 3.43 | 0.70 | 0.61 | 1.45 |
| EXAMPLE 15 | 400k | 0.45 | 6.09 | 0.70 | 0.58 | 2.49 |
| EXAMPLE 16 |  | 0.30 | 5.97 | 0.70 | 0.55 | 2.29 |
| EXAMPLE 17 |  | 0.15 | 5.35 | 0.76 | 0.53 | 2.16 |
| PVP | | | | | | |
| EXAMPLE 18 | 20k | 0.45 | 4.74 | 0.74 | 0.66 | 2.31 |
| EXAMPLE 19 |  | 0.30 | 2.99 | 0.70 | 0.62 | 1.31 |
| EXAMPLE 20 |  | 0.15 | 2.29 | 0.62 | 0.63 | 0.89 |

In Table 3, both polyethylene oxide (PEO) and polyvinylpyrrolidone (PVP) also can be used in the particle colloid. While all using 0.15 g of the polymer materials in EXAMPLES 14, 17 and 20, the power conversion efficiency of the dye-sensitized solar cells by using polyethylene oxide is better than that by using polyvinylpyrrolidone. In addition, the power conversion efficiency of EXAMPLES 12 to 20 is ranging from 0.89% to 2.49%.

Examples 21-24

Photoanode Prepared by Performing Different Processes

The process flows of EXAMPLES 21 to 24 would be described below. The process flow of EXAMPLE 21 (abbreviated as 1p1sg2d) is electrospinning a particle colloid, electrospinning a sol-gel colloid, and then soaking a dye solution. The process flow of EXAMPLE 22 (abbreviated as 1p1sg1d) is electrospinning a particle colloid, electrospinning a sol-gel colloid, and then electrospinning a dye solution. The process flow of EXAMPLE 23 (abbreviated as 1p1sg2sg2d) is electrospinning a particle colloid, electrospinning a sol-gel colloid, soaking the sol-gel colloid and then soaking a dye solution. The process flow of EXAMPLE 24 (abbreviated as 1p1sg2sg1d) is electrospinning a particle colloid, electrospinning a sol-gel colloid, soaking the sol-gel colloid, and then electrospinning a dye solution. The abbreviations "1" and "2" respectively refer to the electrospinning process and the soaking process. The abbreviations "p" and "sg" respectively refer to the particle colloid and the sol-gel colloid. The abbreviation "d" refers to the dye.

The using materials and the process conditions in the steps, including electrospinning a particle colloid, electrospinning soaking a dye solution and electrospinning a dye solution, of EXAMPLES 21 to 24 are respectively the same as those of EXAMPLES 1 and 2; thus, it will not be repeatedly described herein. The process conditions for preparing, electrospinning, and soaking the sol-gel colloid would be described in more detail below.

The preparation of the sol-gel colloid is mentioned below. 0.1 ml titanium(IV) isopropoxide is added into 20 ml ethanol, and 0.05 ml Triton X-100 is then added into the solution to form the sol-gel colloid.

The process voltage is set to 15 kV to 18 kV, and the flow rate is set to 1.0 ml/hr to 1.5 ml/hr.

The step of soaking the sol-gel colloid is soaking the porous second electrospun thin film layer into the sol-gel colloid for a period of about 10 min to fill pores of that layer.

Finally, the photoanode, manufactured by EXAMPLES 21 to 24, and a counter electrode (the same as that of EXAMPLE 1) are assembled, and an electrolyte (the same as that of EXAMPLE 1) is then injected between those electrodes to form a series of dye-sensitized solar cells. The dye-sensitized solar cells tested for photoelectric properties are listed in Table 4.

TABLE 4

| | Jsc (mA/cm$^2$) | Voc (V) | FF (%) | η (%) |
|---|---|---|---|---|
| EXAMPLE 21 (1p1sg2d) | 7.35 | 0.70 | 0.56 | 2.90 |
| EXAMPLE 22 (1p1sg1d) | 6.62 | 0.69 | 0.59 | 2.69 |
| EXAMPLE 23 (1p1sg2sg2d) | 7.37 | 0.74 | 0.60 | 3.25 |
| EXAMPLE 24 (1p1sg2sg1d) | 6.38 | 0.73 | 0.67 | 3.11 |

In Table 4, for the photoanode including the main titanium dioxide layer and the scattering titanium dioxide layer, whether performing soaking or electrospinning the dye solution, the dye-sensitized solar cells all exhibit good photoelectric properties. Furthermore, adding the step of soaking the sol-gel colloid can further increase the power conversion efficiency of the dye-sensitized solar cells.

As mentioned above, the embodiments of the present disclosure provides low cost methods for preparing photoanodes with good performance, and thus those can be employed to solve the problems described in the prior art.

Although the present disclosure has been described in considerable detail with reference to certain embodiments thereof, other embodiments are possible. Therefore, the spirit and scope of the appended claims should not be limited to the description of the embodiments contained herein.

It will be apparent to those ordinarily skilled in the art that various modifications and variations may be made to the structure of the present disclosure without departing from the scope or spirit of the disclosure. In view of the foregoing, it is intended that the present disclosure cover modifications and variations thereof provided they fall within the scope of the following claims.

What is claimed is:

1. A method for fabricating a photoanode of a dye-sensitized solar cell, the method comprising the steps of:
   electrospinning a particle colloid to form a first electrospun thin film layer on a substrate, wherein the particle colloid comprises titanium dioxide nanoparticles, a polymer in aid of film formation, a dispersing agent and a solvent;
   electrospinning a sol-gel colloid on the first electrospun thin film layer to form a second electrospun thin film layer, wherein the sol-gel colloid comprises a titanium alkoxide, a dispersing agent and a solvent; and
   sintering the first electrospun thin film layer to form a main titanium dioxide layer.

2. The method of claim 1, wherein the polymer includes a material selected from the group consisting of polyethylene glycol, polyethylene oxide, polyvinylpyrrolidone and a combination thereof.

3. The method of claim 1, wherein the solvent of the particle colloid is selected from the group consisting of water, ethanol and a combination thereof.

4. The method of claim 3, wherein the solvent of the particle colloid comprises water and ethanol, and the volume ratio of the water to the ethanol is in a range of 0.5 to 2.

5. The method of claim 1, wherein the step of electrospinning the particle colloid is conducted at a process voltage in a range of 12 to 18 kV.

6. The method of claim 1, wherein the step of electrospinning the particle colloid has a flow rate in a range of 0.5 to 1.5 ml/hr.

7. The method of claim 1, further comprising a step of absorbing a dye into the main titanium dioxide layer.

8. The method of claim 7, wherein the step of absorbing the dye comprises soaking the main titanium dioxide layer in a dye solution.

9. The method of claim 7, wherein the step of absorbing the dye comprises electrospinning a dye solution on the main titanium dioxide.

10. The method of claim 1, further comprising a step of soaking the second electrospun thin film layer in the sol-gel colloid after the step of electrospinning the sol-gel colloid.

11. The method of claim 1, wherein the step of electrospinning the sol-gel colloid is conducted at a process voltage in a range of 12 to 18 kV.

12. The method of claim 1, wherein the step of electrospinning the sol-gel colloid has a flow rate in a range of 0.5 to 1.5 ml/hr.

13. The method of claim 1, further comprising a step of sintering the second electrospun thin film layer to form a scattering titanium dioxide layer after the step of electrospinning the sol-gel colloid.

14. The method of claim 13, wherein the step of sintering the first electrospun thin film layer is performed in the same step as the step of sintering the second electrospun thin film layer.

15. The method of claim 13, further comprising a step of absorbing a dye into the scattering titanium dioxide layer.

16. The method of claim 15, wherein the step of absorbing the dye comprises electrospinning a dye solution on the scattering titanium dioxide.

17. The method of claim 16, wherein the step of electrospinning the dye solution is conducted at a process voltage in a range of 2 to 6 kV.

18. The method of claim 16, wherein the step of electrospinning the dye solution has a flow rate in a range of 0.1 to 0.5 ml/hr.

19. A photoanode of a dye-sensitized solar cell fabricated according to the method of claim 1.

* * * * *